UNITED STATES PATENT OFFICE.

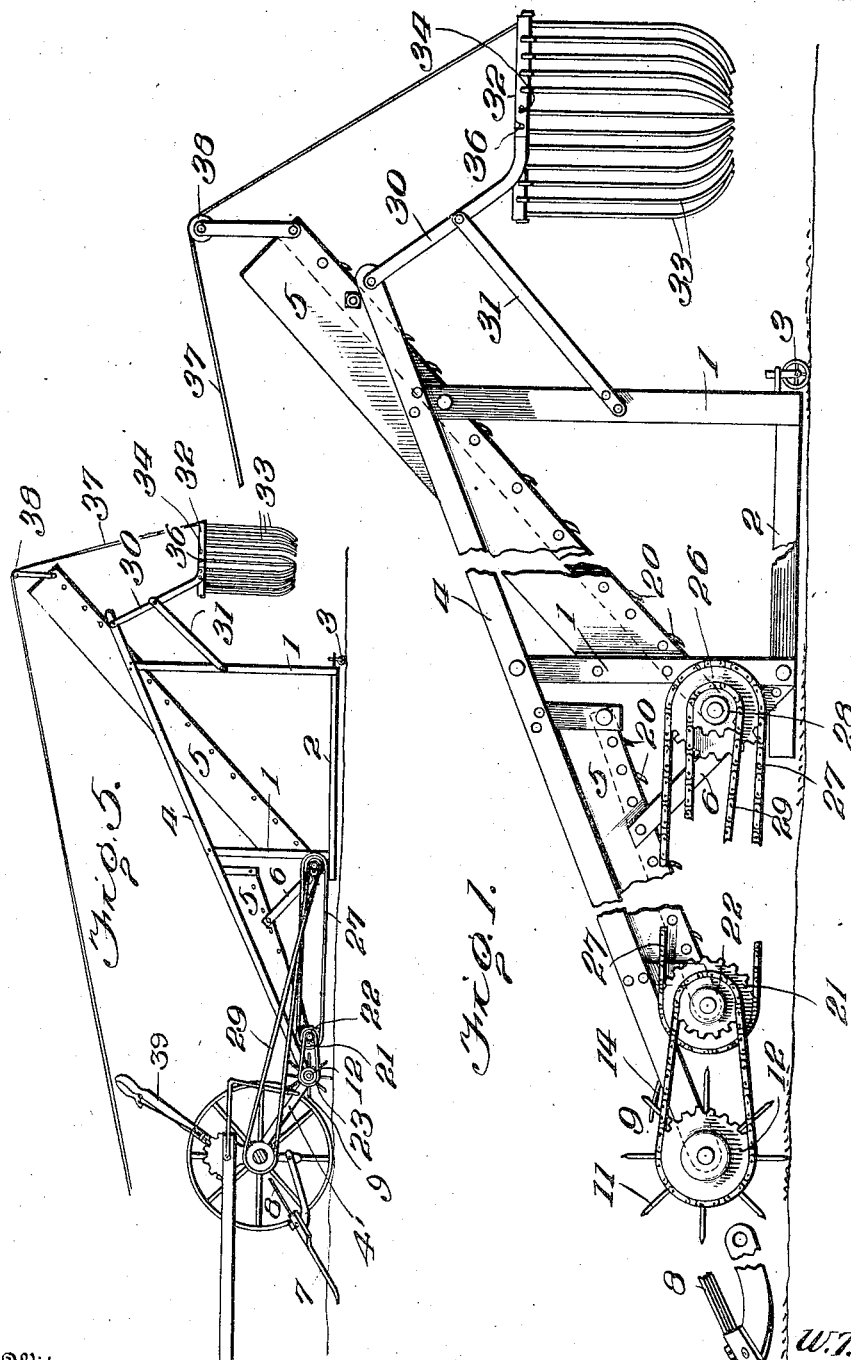

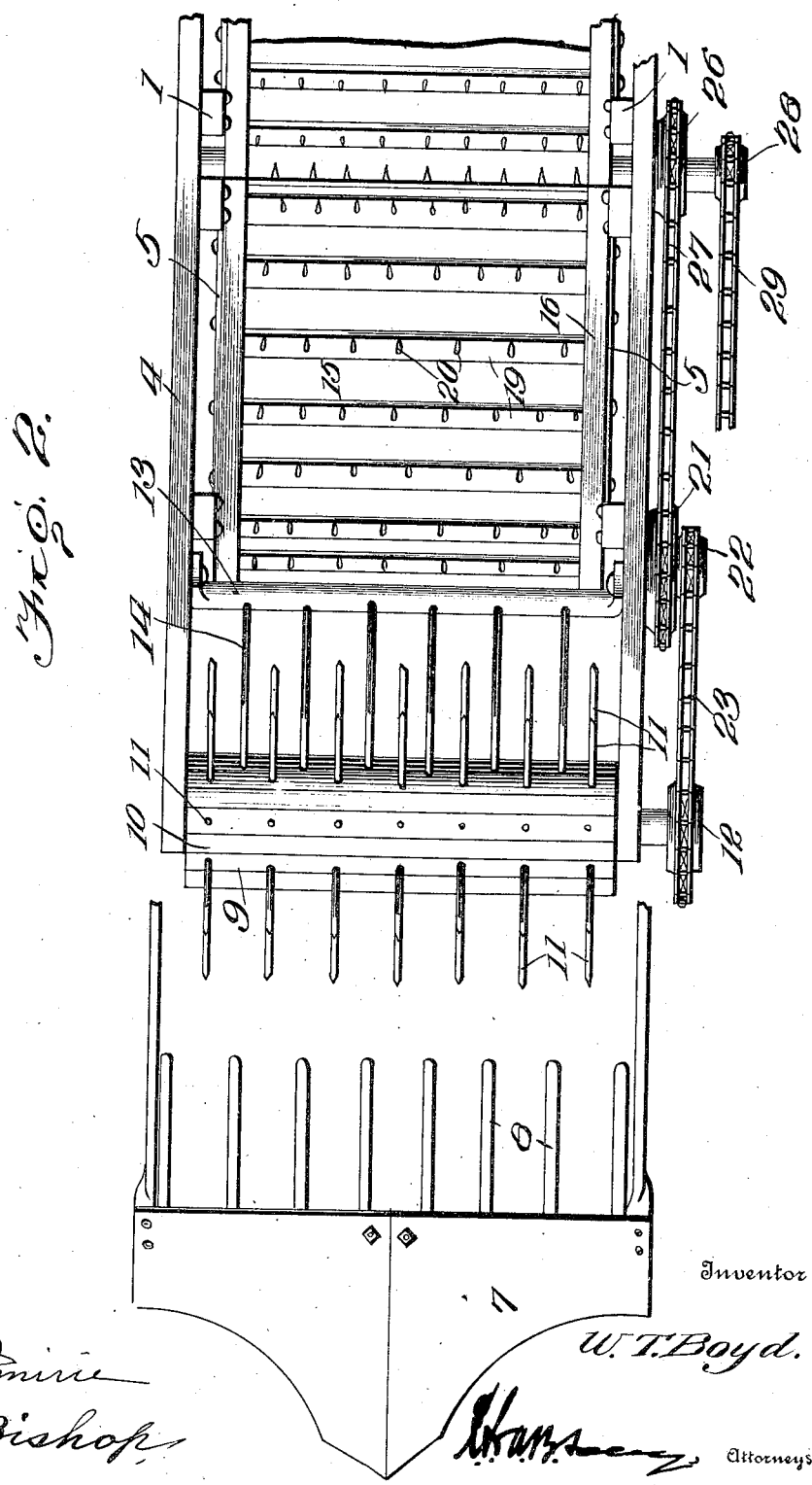

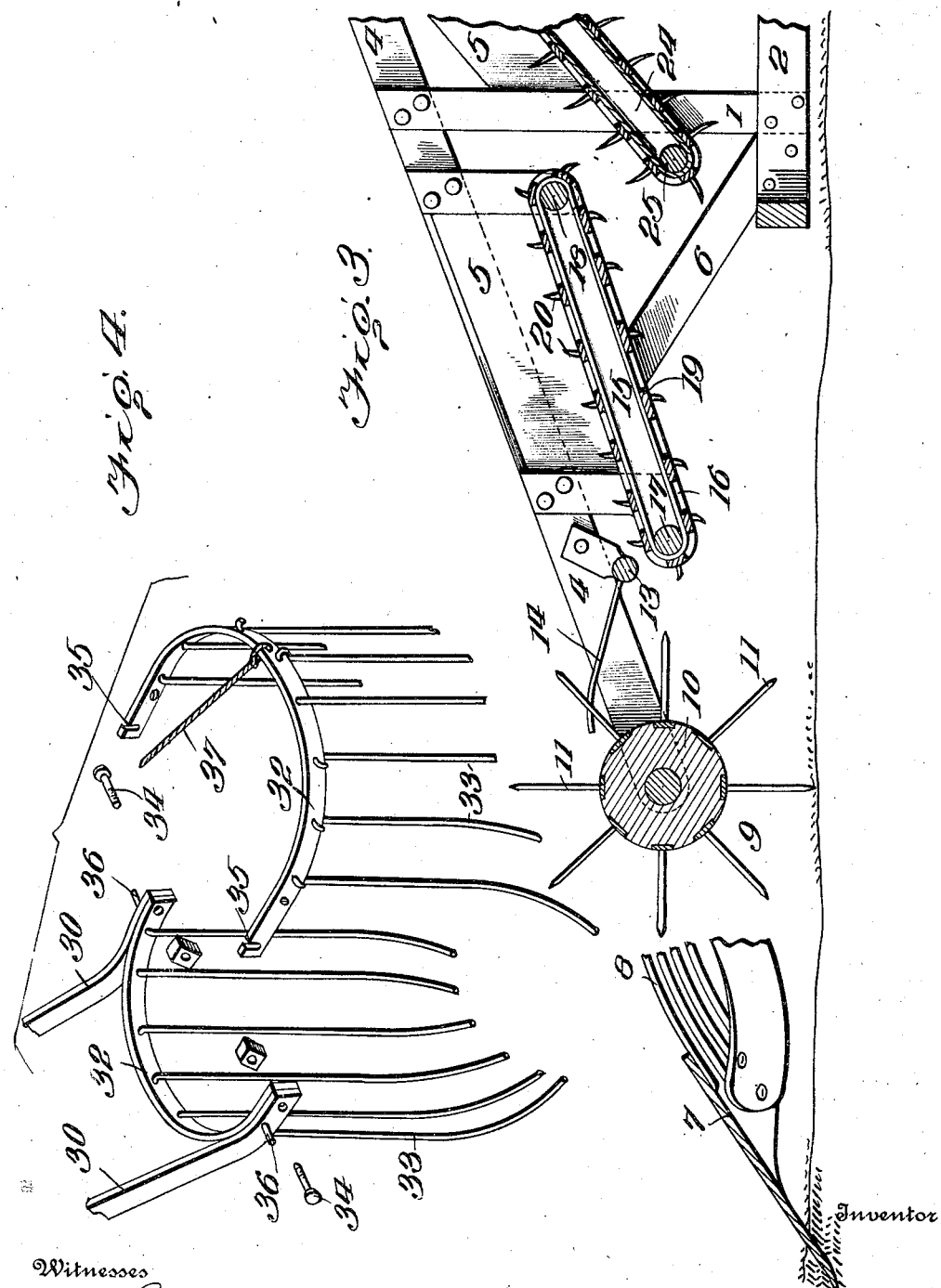

WILLIAM T. BOYD, OF SCRANTON, TEXAS.

PEANUT-HARVESTER.

1,154,368. Specification of Letters Patent. Patented Sept. 21, 1915.

Application filed June 11, 1914. Serial No. 844,539.

*To all whom it may concern:*

Be it known that I, WILLIAM T. BOYD, citizen of the United States, residing at Scranton, in the county of Eastland and State of Texas, have invented certain new and useful Improvements in Peanut-Harvesters, of which the following is a specification.

This invention relates to peanut harvesters and has for its object the provision of a compact and simple machine which may be connected to a riding planter or cultivator and will effectually take up peanut vines and deliver them into a receptacle from which they may be discharged at intervals in quantities sufficient to form a shock.

A further object of the invention is to provide means whereby the vines will be uprooted and will be positively and effectually fed to a receptacle, and also provide means whereby the vines will be stripped cleanly from the gathering devices.

The several stated objects, and such other objects as will appear incidentally from the following description are attained in mechanism such as is illustrated in the accompanying drawings and the invention consists in certain novel features which will be particularly pointed out in the claims following the description.

In the drawings:—Figure 1 is a side elevation of a peanut harvester embodying my present improvements, parts being broken away. Fig. 2 is a partial plan view of the same on a larger scale, Fig. 3 is a longitudinal vertical section of a portion of the machine, Fig. 4 is a detail perspective view of the receptacle, showing the parts of the same separated but in their proper relative positions, Fig. 5 is a diagrammatic elevation.

In carrying out my invention, I employ a frame consisting of uprights 1, connected at their lower ends by beams 2 and at the rear side of said frame is a caster wheel 3 to aid in supporting and to facilitate the travel of the machine.

To the upper ends of the uprights 1 are secured side bars 4 which incline downwardly and forwardly from the said uprights to support the several operating members. Side plates or bars 5 are also secured to the uprights and to the side bars 4 so as to form retainers or walls for the conveyers, and the forward side plates 5 are connected with the forward uprights by braces 6, as shown. The forward extremities of the side bars 4 are connected, by links 4' or in any other preferred manner, with a cultivator or planter frame. Upon said frame, I mount a plow 7 which may be of any desired or preferred form and is illustrated as consisting of plates having a central forwardly projecting point adapted to take into the ground. To the rear side of the shovel or plow I secure the spaced rods or fingers 8 which extend rearwardly and upwardly from the plow and serve as separators to permit large lumps of dirt to fall from the vines. In rear of the plow is a revolving rake or take-up roller 9 which consists preferably of a cylindrical body 10 which is suitably journaled in the front ends of the side bars 4 of the frame, and series of radial teeth 11 carried by the said body. The cylindrical body is provided with trunnions or otherwise constructed to form journals which are rotatably engaged in the side bars 4, and one of the trunnions or journals is extended through and beyond the adjacent side bar and is equipped with a sprocket wheel 12, as shown. The teeth 11 are arranged in several longitudinal series and are preferably so disposed as to alternate with the teeth or rods 8 projecting from the plow so that each one of the teeth 11, when the machine is in use, will move upwardly between the planes of two adjacent rods or fingers 8. Secured to and extending between the side bars 4, in rear of the revolving rake, is a stationary cross bar 13 from which extend stripping fingers or rods 14 which project upwardly and forwardly to extend slightly over the revolving rake and are disposed alternately with the teeth of the said rake, as shown in Fig. 2.

It will be readily understood that as the apparatus is drawn forward over a field along a row of plants, the plow will take into the ground so as to uproot the plants and the continuous travel of the machine will then cause the plow and the fingers projecting rearwardly therefrom to ride under the plants which will be delivered in rear of the plow whence the revolving rake will pick them up from the ground and carry them up over and to the rear, where they will be stripped from the rake by the fingers 14 and will slide down said fingers onto a conveyer 15 disposed in rear of the cross bar 13 and supported by and between the forward side plates 5. This conveyer 15 consists of endless chains or belts 16, which pass around rollers 17 and 18, and cross bars 19 secured to and extending transversely between the said chains or belts and equipped with outwardly projecting teeth 20 which engage the vines so as to positively feed them over the conveyer. The forward roller 17 of the conveyer 15 has one end extended through and beyond the adjacent side plate and is equipped with sprocket wheels 21 and 22, a chain 23 being trained around the sprocket wheel 22 and the sprocket wheel 12 so that motion will be imparted to the revolving rake from the conveyer. In rear of the conveyer 15 is an elevating conveyer 24 which is disposed between the rear side plates 5 and is similar in construction to the conveyer 15. The roller 25 which supports the front end of the said elevator is extended at one end through the adjacent portion of the frame and is equipped with a sprocket wheel 26 around which, and the sprocket wheel 22, is trained a chain 27 so that the conveyer 15 and the elevator will be simultaneously operated and in the same direction. The said projecting end of the roller 25 is also equipped with a sprocket wheel 28 and a chain 29 is trained around said sprocket wheel which may receive motion from any convenient operating wheel on the planter or cultivator. It will thus be seen that the two conveyers and the revolving rake will be positively operated and will travel in the same direction so that the vines taken up by the plow will be positively fed to the rear of the machine.

To the rear extremities of the side bars 4, I secure the rigid brackets or downwardly and rearwardly projecting arms 30 which are reinforced by braces 31 extending therefrom to the rear uprights 1, and to the lower extremities of the said arms, I secure rigidly one member of the receptacle. Said receptacle consists of a divided ring or annular band 32 and rods 33 secured rigidly to the said band and depending therefrom, the lower extremities of said rods being turned inwardly so as to converge toward the axis of the said ring or band and thereby form a support for the vines delivered to the receptacle. The forward member of the annular band is secured rigidly to the lower ends of the arms 30 by bolts 34 inserted therethrough and the rear member of the said band is pivotally mounted upon the same bolts, the extremities of the said rear member of the band being extended inwardly beyond the pivotal points and provided with notches 35 in their upper edges adapted to engage pins or studs 36 projecting laterally from the arms 30 in advance of the extremities of the same. The weight of the rear member of the band or ring and the rods carried thereby, together with the weight of the vines placed in the receptacle, tends to swing the rear member of the receptacle downwardly upon its pivots and this tendency is checked by the provision of the pins or studs 36 and the notches 35 engaging the same so that, when the vines are being fed into the receptacle, the members thereof will be held in their proper normal positions so as to receive and hold a large quantity of the vines. When the receptacle is full, a pull is exerted upon the cable or flexible operating member 37 which is secured to the upper edge of the rear member of the receptacle and extends upwardly and forwardly therefrom to the planter or cultivator, being guided by an idler or pulley 38 suitably supported on the upper rear end of the elevator 24. When a pull is exerted upon the cable or operating member 37, the rear member of the receptacle will be swung upon its pivotal support so that the lower ends of its rods 33 will move away from the lower ends of the rods carried by the forward member of the receptacle and the contents thereof will be thereby discharged onto the ground.

A lever 39 is mounted on the frame of the cultivator or planter and connected with the front portion of the harvester frame so that, by manipulating the lever, the harvester frame may be raised or lowered.

As the machine is drawn over the field, the vines will be uprooted, taken up and caused to travel to the rear of the machine and be deposited in the receptacle as described and as will be readily understood. It will be noted that throughout their travel through the machine, the vines will be supported upon skeleton-like structures so that the vibration of the machine caused by irregularities in the surface of the ground will shake from the vines all sand and lumps of dirt tending to cling thereto and the vines, when gathered, will be free of foreign substances.

The several parts of my machine are very simple in their construction and there are no complicated arrangements of any of the mechanism so that the apparatus is not apt to get out of order and repairs will not frequently be needed.

Having thus described my invention, what I claim and desire to secure by Letters Patent is:—

1. The combination of a plow, a revolving rake running on the ground in rear of the plow to pick up vines and carry them up over and to the rear, a conveyer disposed in rear of and spaced from the rake, and stripping fingers interposed between the rake and the conveyer and projecting forwardly over the rake.

2. The combination of a revolving rake, a conveyer disposed in rear of and spaced from the rake, and a transverse series of longitudinal stripping fingers bridging the space between the conveyer and the rake and inclined downwardly from a point over the rake to a point immediately over the front lower end of the conveyer and arranged alternately with the pins of the rake.

3. The combination of a frame comprising downwardly inclined side bars, a revolving rake mounted in and extending between the lower front ends of said side bars and including a series of radial pins, a conveyer mounted between the side bars in rear of and spaced from the rake, a cross bar secured rigidly between the side bars adjacent the forward end of the conveyer and above the same, and stripping fingers extending upwardly and forwardly from said bar between the pins of the rake and having their forward free ends disposed near the axial body of the rake.

4. The combination of a wheeled frame, a plow carried by said frame, a caster-supported frame arranged in rear of the wheeled frame, a revolving rake mounted in the front end of said caster-supported frame, a conveyer mounted in said frame, stripping fingers bridging the space between the conveyer and the revolving rake, and means whereby the same conveyer and the revolving rake may be actuated from the wheeled frame.

In testimony whereof I affix my signature in presence of two witnesses.

WILLIAM T. BOYD. [L. S.]

Witnesses:
 R. G. BOLAND,
 J. H. D. FLEMING.